United States Patent Office 3,012,486
Patented Dec. 12, 1961

3,012,486
BITUMINOUS COMPOSITIONS
Herbert A. Newey, Lafayette, Calif., assignor to Shell Oil Company, a corporation of Delaware
No Drawing. Filed Mar. 30, 1959, Ser. No. 802,654
19 Claims. (Cl. 94—22)

This invention relates to new bituminous compositions. More particularly, the invention relates to new bitumen compositions containing special reactive components which are particularly useful for preparing roadways and walkways and/or surfacing already prepared roadways and walkways.

Specifically, the invention provides new and particularly useful compositions comprising (1) a bitumen material, such as, for example, paving grade asphalt, (2) a polyepoxide having more than one vic-epoxy group, and preferably a liquid polyglycidyl ether of a polyhydric phenol, and (3) a copolymer of an unsaturated monocarboxylic acid containing no more than eight carbon atoms and a dissimilar ethylenically unsaturated monomer, and preferably an ethylenically unsaturated hydrocarbon. The invention further provides cured products obtained by heating the above-described compositions. As a special embodiment, the invention further provides a method for utilizing the above-described compositions in the construction of new roadways, airfields, walkways and the like, or as a surfacing composition for already prepared surfaces, particularly to impart skid resistance.

There is a growing need for better materials for use in construction of roadways, airfields and the like. Such materials, for example, should have better wear resistance, better solvent and heat resistance (as in the case of asphalt roads) and better resistance to skidding. There is also a need for an economical surfacing composition that can be applied to already formed concrete and asphalt road or storage areas to help reduce the destruction of the surface due to wear, rain, deicing salts and cracking due to brittleness in cold weather. In the case of asphalt surfaces, there is also a need for coatings that would improve resistance to heat and solvents. This is particularly urgent in the case of maintenance areas, warm-up pads and asphalt runways for jet aircraft as the heat and jet fuels readily attack asphalt surfaces. Further, concrete and asphalt road surfaces and exposed metal on bridge roadways, etc. tend to develop smooth surfaces due to wear which cause skidding when set and there is a great need for a non-skid coating that will adhere to these surfaces.

Various compositions have been suggested for the above purposes, but the compositions suggested heretofore have not proved very satisfactory. In most cases, the new compositions fail to have any improved wearability, solvent resistance or skid resistance. When applied as a coating over already prepared concrete and asphalt roadways, they fail to have the necessary adhesion, particularly if the surfaces are the least oily or dirty. In other cases, the coatings fail to stand up under inclement weather conditions. In still other cases, the coatings fail to have the necessary resistance to solvents and heat or fail to have good wear and non-skid properties. In other cases, the coatings are too brittle for use on large areas. In still other cases, the coatings are too expensive or too difficult to apply.

It is an object of the invention, therefore, to provide new compositions which are suitable for use in the construction of new roadways, airfields, walkways and the like. It is a further object to provide new compositions which may be used to prepare roadways which have better wearability, solvent resistance and skid resistance. It is a further object to provide new compositions which are useful as coatings for concrete, asphalt, wood and metal surfaces. It is a further object to provide new compositions which form coatings for concrete, asphalt, wood and metal having excellent resistance to wear, rain and cold weather. It is a further object to provide new surfacing compositions which form films having good resistance to solvents, heat and deicing salts. It is a further object to provide new surfacing compositions which have good flexibility. It is a further object to provide new surfacing compositions which have good skid resistance. It is a further object to provide new coatings which are relatively inexpensive and can be easily applied to new and old surfaces and surfaces which have large area. Other objects and advantages of the invention will be apparent from the following detailed description thereof.

It has now been discovered that these and other objects may be accomplished by the compositions of the invention comprising (1) a bitumen material, such as, for example, paving grade asphalt, (2) a polyepoxide having more than one vic-epoxy group, and preferably a liquid polyglycidyl ether of a polyhydric phenol and (3) a copolymer of an alpha,beta-ethylenically unsaturated monocarboxylic acid containing at least six carbon atoms and a dissimilar ethylenically unsaturated monomer.

It has been unexpectedly found that the above-described compositions are excellent binders for aggregate and in combination therewith form compositions which can be used to form superior roadways, airfields, walkways and the like. The roadways, etc. prepared from these special compositions have excellent wearability, excellent heat resistance and solvent resistance and good skid resistance. In addition, it has been found that the above-described compositions can be used as surfacing compositions for already formed roadways, airfields, walkways and the like, and particularly those prepared from concrete, asphalt, wood, metal and the like. They have excellent adhesion to such surfaces and can be cured in combination therewith to form tough flexible coatings. The resulting surfaces also have surprising resistance to solvents, such as gasoline, jet fuels and the like, and have good heat resistance, i.e., do not soften or run when exposed to high temperatures. In addition, the wear resistance and resistance to weather are outstanding for such coatings.

When small inert particles are added to the compositions before or during cure, the cured coatings have excellent resistance to skidding. The coatings are particularly attractive for use on highways and runways, as they can be easily applied to large areas and set up quickly without the use of any special curing conditions.

These compositions have been found to be useful not only for the treatment of roadways and airfields, but are equally valuable for the treatment of dock area, warehouse floors, sidewalks, tennis courts, ship decks, and the like where wear and weather resistant properties are desired.

It was quite unexpected to find that the new compositions had such superior properties. It had been found heretofore, for example, that certain bituminous materials, such as straight run asphalts, were incompatible with polyepoxides, such as glycidyl polyethers. Further, it was unexpected to find that the coatings were highly flexible and heat resistant as it is known that bituminous materials generally form brittle coatings which soften on heating. The polyepoxides also form relatively brittle coatings in comparison with those of the compositions described.

The bituminous materials used in the compositions of the present invention include substances containing bitumens or pyrobitumens, pyrogeneous distillates and tar, pyrogeneous waxes and pyrogeneous residues (pitches and pyrogeneous asphalts). They are preferably composed mainly of hydrocarbons although they may contain amounts of sulfur, nitrogen and oxygen-containing materials. They also are preferably fusible and largely soluble in carbon disulfide. Examples of such bituminous materials may be found in Abraham's "Asphalts and Allied Substances," vol. I, page 57, 5th edition.

An especially preferred group of bituminous materials to be used in the compositions of the invention include the asphalts. These asphalts may be straight run, blown, cracked and catalytically or non-catalytically polymerized asphalts. All such asphalts are useful regardless of their original penetrations or softening points.

Especially preferred are the straight run asphalts used for paving, such as those having penetrations between 40 and 300 and softening points within the range from about 145° F. to about 95° F. Blown asphalts are normally produced in the presence or absence of catalysts by blowing asphalts or fluxes at elevated temperatures with an oxygen-containing gas such as air. Typical blown asphalt may have softening point range of between about 300° F. and about 120° F. and a penetration within the range from about 100 to about 0.

Aromatic asphalts, such as those comprising the bottoms products from the distillation of catalytically cracked gas oil, are also preferred.

Other preferred materials include high boiling extracts of petroleum, such as those obtained by extracting petroleum with solvents having preferential selectivity for aromatic. To obtain such extracts various non-reactive, highly polar, aromatically preferential solvents are used such as liquid SO₂, phenol, cresylic acid, furfural, beta, beta-dichloroethyl ether, nitrobenzene and the like. The use of the so-called double solvent process employing mutually immiscible solvents like cresylic acid and propane also gives suitable extracts. Especially preferred are the Edeleanu and furfural extracts of petroleum distillates, i.e., extracts obtained by use of liquid SO₂ or liquid SO₂ in combination with benzene, etc. The extracts are high-boiling materials which range in general from viscous liquids to tar-like materials at ordinary temperatures. Extracts boiling above 300° C. at 760 mm. Hg are preferred.

Another preferred group of bituminous materials include residual fuel oils, such as residual fuel oils having a viscosity between 10 cs. at 100° F. to about 1500 cs. at 100° F.

Also preferred are the products derived from coal such as coal tars, refined coal tars and coal tar pitches, and preferably those having a softening point below 190° F. and a solubility in carbon disulfide of at least 50%. The expression "tar" as used herein refers to products obtained in connection with the destructive distillation of coal. When part of the volatile material is removed, the residue is called "refined coal tar." When additional volatile material is removed, the residue is termed "coal tar pitch." Residuals having a fusing point below about 90° F. are referred to herein as refined coal tars while those having fusing points of 90° F. or above are coal tar pitches. As used herein, in reference to coal tar products, "softening point" or "fusing point" refers to values obtained by the cube method as described in vol. II, Abraham, "Asphalts and Allied Substances," 5th edition. The coal products should possess at least 50% and preferably 75% solubility in carbon disulfide. The coal tar, refined coal tar and coal tar pitch may be acidic, basic or neutral depending on whether the acid and/or bases have been removed. These coal products may be obtained from various types of bituminous coals, such as, for example, cannel, bog-peat, carbonite, and the like, and may be derived from various processes, such as from gas works, coke ovens, blast furnaces, gas producers and various low temperature processes. Description of examples of various coal tars, refined coal tars and coal tar pitches may be found on pages 384 to 405 of Abraham, "Asphalts and Allied Substances."

Particularly preferred coal derivatives to be used in preparing the compositions of the present invention include the residuals resulting from distillation of coal tar, and preferably refined coal tars having a fusing point of below 70° F. and a solubility in carbon disulfide of at least 75% with a specific gravity of 1.10 and 1.50, and low melting coal tar pitches having a fusing point below 120° F. and a solubility in carbon disulfide of at least 75%.

The polyepoxides to be used in preparing the compositions of the invention comprise those materials possessing more than one vicinal epoxy group, i.e., more than one

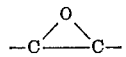

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458, and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflow, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tertarate, di(4,5-epoxytetradecyl) maleate, di(2,3-epoxybutyl) azelate, di(3,4-epoxybutyl) citrate, di(5,6-epoxyoctyl) cyclohexane-1,3-dicarboxylate, di(4,5-epoxyoctadecyl) malonate.

Another group of epoxy-containing materials include those epoxidized esters of unsaturated alcohols and unsaturated carboxylic acids, such as 2,3-epoxybutyl 3,4-epoxypentanoate, 3,4 - epoxyhexyl 3,4 - epoxypentanoate, 3,4-epoxycyclohexyl 3,4 - epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eiconsanedioate, dihexyl 6,7,10,11-diepoxyhexadecanedioate, didecyl 9-epoxy-ethyl-10,11-epoxyoctadecenedioate, dibutyl 3-butyl-3,4,5,6-diepoxycyclohexane- 1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprise the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group includes the glycidyl-substituted nitrogen compounds as diglycidyl aniline, diglycidyl and triglycidyl amine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and polyether B described in above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.) polyglycidyl ether of 1,1,5,5-tetrakis(hydroxyphenyl)-pentane (epoxy value 0.514 eq./100 g.) and the like and mixtures thereof.

The copolymer used in the compositions of the present invention are those obtained by polymerizing an unsaturated monocarboxylic acid containing no more than six carbon atoms with a dissimilar ethylenically unsaturated monomer. The unsaturated acid used in making these copolymers may be exemplified by acrylic acid, methacrylic acid, ethacrylic acid, crotonic acid, 5-hexenoic acid, 3-methyl-2-butenoic acid, 3-ethyl-2-pentenoic acid, chloroacrylic acid, 3-chloro-2-butenoic acid and the like. Particularly preferred acids to be used are terminally unsaturated acids and preferably the alpha,beta-unsaturated acids as acrylic acid.

The ethylenically unsaturated monomers that may be copolymerized with the above-described alpha,beta-unsaturated acids include those copolymerizable ethylenically unsaturated monomers which contain one or more ethylenic groups, such as, for example, styrene alphamethyl styrene, p-methoxy styrene, p-octylstyrene, vinyl toluene, beta-vinyl naphthalene, 2,4-dichloro-styrene, 3,5-dimethyl styrene, chlorostyrene, butadiene, isoprene, 1,3-dimethyl pentadiene, cyclopentadiene, pyropylene, ethylene, butylene, octylene, decylene, octadecene, eicosadiene, acrylonitrile, vinyl ethyl ether, vinyl acetate, allyl acetate, vinyl benzoate, allyl stearate, allyl cyclohexanecarboxylate, acrylonitrile, methacrylonitrile, methyl methacrylate, octyl acrylate, allyl acrylate, vinyl chloride, vinyl cyanide, diallyl phthalate, divinyl succinate, allyoxypropionaldehyde, diallyl ether of ethylene glycol, triallyl ether of glycerol, allylether of pentarythritol, N-allyl acrylamide, and the like, and mixtures thereof.

Particularly preferred dissimilar monomers to be used include the unsaturated hydrocarbons containing up to 15 carbon atoms, and preferably the mono- and diethylenically unsaturated aliphatic, cycloaliphatic and aromatic substituted aliphatic hydrocarbons containing up to 10 carbon atoms, such as styrene, butadiene, isoprene and the like; and the alkenyl alkyl ethers and alkenyl esters.

The polymers of the invention are prepared by heating the mixture of monomers in the presence of a free radical polymerization catalyst, and preferably a peroxide catalyst, such as, for example, benzoyl peroxide, acetyl peroxide, cumene hydroperoxide, lauroyl peroxide, tertiary-butyl hydroperoxide, di-tertiary-butyl peroxide, 2,2-bis-(tertiary-butyl peroxy) butane and like peroxides, as well as molecular oxygen, relatively pure or diluted with inert gas, e.g., nitrogen, methane, etc. When using peroxides, about 0.0% to 5% is suitable, although larger or smaller proportions may be employed if desired. Molecular oxygen is used as catalyst by bubbling or dispersing the gas into and through the liquid polymerization mixture. The amount of oxygen employed may be varied over extremely wide limits with little or no effect on the course of the copolymerization.

The polymerization is conducted with the polymerizing mixture in liquid phase at about 50° C. to 300° C. Ordinary reflux temperature is often convenient although this temperature is usually too low to effect the copolymerization with desired rapidity. Consequently, it is usually preferable to operate at about 125° to 250° C., at which temperatures it may be necessary to employ superatmospheric pressure, such as from 100 to 300 pounds per square inch or even higher in order to keep the polymerizing mixture in liquid phase.

While it is usually desirable to effect the polymerization without the presence of other added substances than the polymerizing compounds and the catalyst, it is sometimes convenient to also have present an inert solvent, such as hexane, benzene, toluene, or xylene. The use of such inert solvents is advantageous for enabling the polymerizing mixture to be fluidly liquid under the polymerizing conditions with compounds of higher molecular weight.

In some cases, the polymerization is effected by adding one or more of the compounds to the polymerizing mixture during the course of the copolymerization. This procedure is especially useful with mixtures wherein one compound polymerizes at a much faster rate than the other. In such cases, the faster polymerizing compound is added continuously or intermittently during the copolymerization.

Depending upon the use to which the copolymer is put, the amount of the alpha,beta-unsaturated acid and the amount of the dissimilar monomer may be varied to a considerable extent. In most cases for road applications, it is desirable to have a copolymer containing from 2% to 40% by weight of the unsaturated acid. Preferably, the copolymer contains from 5% to 20% by weight of the unsaturated acid. The copolymers having outstanding properties as a flexibilizing agent for the road coating compositions preferably contain from 20% to 95% by weight of a dissimilar hydrocarbon monomer, such as butadiene, pentadiene, isoprene and the like.

The copolymers employed in the compositions of the invention will vary from liquids to soft and hard solids, and will preferably have rather low molecular weights, e.g., mol weights varying from about 800 to about 10,000, and still more preferably from 800 to 3500. The mol weights as referred to herein and in the appended claims are determined ebullisocopically in dichloroethane.

The preparation of several of the above-described copolymers is illustrated below:

COPOLYMER OF BUTADIENE AND ACRYLIC ACID 9200 parts of mesityl oxide were placed in a nickel reactor and blanketed with nitrogen. The mesityl oxide was then heated to 150° C. and a mixture of 1049 parts of butadiene, 384 parts of acrylic acid dissolved in mesityl oxide and 78 parts of ditertiary butyl peroxide were added to the reactor over a 1 hour period. During this time, the temperature was maintained at 150° C. The addition was continued until at the end of 3.5 hours the total charge added to the reactor was 3212 parts butadiene, 825 parts acrylic acid, 164 parts of ditertiary butyl peroxide and 9630 parts mesityl oxide. At the end of the reaction period, the mesityl oxide was removed by distillation leaving a viscous liquid copolymer having a molecular weight of 1150 and an acidity of 0.23 eq./100 g.

The above experiment was repeated with the exception that the charge comprised 9675 parts of mesityl oxide, 3402 parts butadiene, 304 parts acrylic acid and 178 parts of ditertiary butyl peroxide. In this case, the resulting product was a viscous liquid polymer having a mol weight of 1500 and an acidity of .08 eq./100 g.

COPOLYMER OF BUTADIENE AND METHACRYLIC ACID 920 parts of mesityl oxide are placed in a nickel reactor and blanketed with nitrogen. The mesityl oxide is then heated to 150° C. and a mixture of 1049 parts of butadiene, 425 parts of methacrylic acid dissolved in mesityl oxide and 78 parts of ditertiary butyl peroxide added to the reactor over a period of 1 hour. During this time, the temperature was maintained at 150° C. The addition was continued until at the end of 3.5 hours the total charge added to the reactor was 3212 parts butadiene, 925 parts methacrylic acid, 164 parts of ditertiary butyl peroxide and 9630 parts mesityl oxide. At the end of the reaction, the mesityl oxide is removed by distillation leaving a viscous copolymer having a molecular weight of about 1200 and an acidity of about 0.24 eq./100 g.

COPOLYMER OF BUTADIENE, STYRENE AND ACRYLIC ACID

The first preparation above showing the preparation of a butadiene-acrylic acid copolymer is repeated with the exception that 20% by weight of the butadiene is replaced with styrene. The resulting product is a very thick liquid copolymer having a molecular weight about 1200 and an acidity of about 0.21 eq./100 g.

COPOLYMER OF ISOPRENE-ACRYLIC ACID

The first preparation above showing the preparation of a butadiene-acrylic acid is repeated with the exception that the butadiene is replaced with isoprene. The resulting product is a viscous copolymer having a mol weight of about 1800 and an acidity of about 0.25 eq./100 g.

The compositions of the invention may be prepared by a variety of different methods. When the compositions are to be utilized as surfacing compositions which may be cured at elevated tempertaures, it is generally preferred to mix the hot bituminous material with the copolymer and then combine this hot mixture with the polyepoxide and catalyst (if desired) just before application. If the compositions are to be used in combination with aggregate, hot aggregate may then be added before application.

It is also possible to combine all three ingredients together at the same time, preferably in a heated condition, mixing (with catalyst and aggregate as desired) and then shortly applying the mixture to the desired surface. This type of operation appears to be desirable for coatings of large highway or airfield areas.

It is possible to combine the three ingredients together without the use of heat, but this makes mixing and handling sometimes difficult.

If the compositions of the invention are to be used for certain applications, such as the laminating of paper, or in applications where a high initial viscosity is desired and in which the cure is to be completed at lower temperatures such as near room temperature, it is highly desirable in the mixing to first combine the copolymer and polyepoxide together while hot for a certain period as noted hereinafter to effect a type of precondensation and then add the bituminous material and other desired additives, such as, for example, aggregate and the like. Some or all of the bituminous materials may also be present during this precondensing period.

The proportions of the three components to be utilized in the above methods of preparation may vary within certain limits. The polyepoxide and the copolymer are preferably combined in approximately chemical equivalent amounts, i.e., an amount sufficient to furnish one epoxy group for every carboxyl group. Up to about 30% excess of either reactant may be employed, however, and still obtain the desired results.

The amount of the reactive components, i.e., the polyepoxide and the copolymer, to be employed in relation to the amount of the bituminous material will preferably vary from about 0.5% to about 85% by weight, the proportion being governed by the intended use of the final product. For example, if a substantially infusible composition is desired, the proportion of the polyepoxide and copolymer should be in excess of about 15%, and preferably 20% to 50%. If, on the other hand, it is desired only to increase the softening point moderately or to decrease the penetration of an asphalt to a limited extent, the presence of from 0.5% to 10% by weight of the polyepoxide and copolymer, shows a striking response with respect to both properties. The normal amounts of these components to be used in relation to the bituminous material will preferably vary from about 20% to about 65%.

As noted, it its preferred to employ heat during the mixing of the components. Preferred temperatures range from about 200° F. to about 400° F., and more preferably from about 250° F. to 350° F. The heat may be applied by first preheating one or more of the ingredients, such as the asphalt and polymerized acid, or by heating the mixture of the two or three components together.

In the case where precondensation of the polyepoxide and copolymer is desired, the heating of the mixture should be extended to effect the necessary precondensation. The exact time selected will depend, in large part, upon the temperature employed.

An especially preferred type of composition covered by the present invention include those wherein aggregate, sand, etc. are added before, during or after the preparation of the compositions. If the compositions are to be used as binders for aggregate in construction of new roadways, airfields and walkways, as noted hereinbefore, the aggregate (e.g., crushed rock, quartz, shells, aluminum oxide particles, etc.) may be added. If the compositions are to be used as surfacing compositions to form skid resistant coatings, the aggregate may also be added before, after or during the preparing. In this case, the aggregate, sand, etc. is preferably added after the coating has been spread. It is also desirable, in some cases, to add a part of the particles during the preparation and then spread addition particles on the coating after it has been applied to the surface. In the case of coating highways and walkways, it is generally preferred to apply the inert particles after the composition has been spread on the road or walkway. Excess particles may be removed after cure has taken place.

The inert particles or aggregate should preferably be rather small and preferably have a mesh size varying from about 4 to 300. Preferred materials include sand, crushed rocks, finely divided shells, crushed quartz, aluminum oxide, finely divided resinous particles, and the like. Particularly preferred are the minerals, and especially the siliceous materials, such as, for example, sand and ground rock. Mixtures of various types of particles may also be used.

When used to prepare roadways etc., it is generally preferred to add the hot aggregate and then mix the components together in a cement or other type of mixer and then apply this mixture to the prepared roadway bed. Roadways prepared in this manner containing large rocks are useful as warning or "rumble" strips for highways.

The compositions of the invention may be cured to form the desired product by application of heat. Temperatures used in such cure generally range from about 100° C. to about 250° C. This heat may be applied by the addition of the above components in a preheated condition, by the adding of heated mineral aggregate to the mixture of components or by spreading of heated inert particles or aggregate on the compositions after being spread. The heat may also be applied externally by means of electrical or other types of heaters, infrared lamps, etc.

It was found that the asphalts contain basic nitrogen compounds which act to accelerate the cure of the polyepoxide. With the other bituminous materials, it is desirable to add a curing agent to accelerate cure. The curing agents are particularly desirable if the good curing rates are desired at the lower temperatures.

A great variety of substances are now known to be hardening agents for the resin-forming ingredients of the composition such as alkalies like sodium or potassium hydroxide; alkali phenoxides like sodium phenoxides; carboxylic acids or anhydrides such as oxalic acid or phthalic anhydride; Friedel-Crafts metal halides like aluminum chloride, zinc chloride, ferric chloride, or boron trifluoride, as well as complexes thereof with ethers, acid anhydrides, ketones, diazonium salts, etc.; phosphoric acid and partial esters thereof including n-butyl ortho-phosphate, diethyl ortho-phosphate and hexaethyl tetraphosphate; and amino compounds such as triethylamine, ethylene diamine, diethylamine, diethylene triamine, triethylene tetramine, pyridine, piperidine, N,N'-diethyl-1,2-propane-diamine, dicyandiamide, melamine, fatty acid salts of amines, and the like. The curing agent is added and mixed in with the composition after its preparation as noted above. The amounts vary considerably depending upon the particular agent employed. For the alkalies or phenoxides, 1% to 4% is generally suitable. With phosphoric acid and esters thereof, good results are obtained with 1 to 10% added. The amino compounds are preferably used in amounts of about 5 to 15% and the others involve addition of about 1 to 45%.

The compositions of the invention may be utilized for a great variety of different applications. As noted, they can be used as binders in the construction of roads. In this case, the mixtures such as, for example, 1 to 6 inches thick. Conventional paving equipment may be used in this application.

They are also particularly suited for use as surfacing compositions for various materials, such as concrete, asphalt, wood and steel. The concrete may be of any of the usual types, such as may be prepared from hydraulic cements, such as Portland cement and other types of aluminous and oxy salt type cements. The asphalt surfaces may be those prepared from straight run asphalts or further refined or modified asphalts. The compositions may be applied in very thin coatings or in very thick coatings. The application to the surface may be accomplished in any suitable manner. If material is thick or contains large amount of inert particles, the material may best be applied by use of screed, trowel shovel or broom. If it is of a more fluid nature, it may be generally applied by brushing or spraying. The coatings will generally vary in thickness from about 1/16 to about 1/4 inch.

The compositions are also useful as coating for pipes, off-shore drilling rigs and the like.

The compositions may also be used to make pottings and castings, gasket sealing compositions, roofing compositions and in lamination of paper and the like.

The following examples illustrate the present invention. Unless otherwise specified, parts disclosed in the examples are parts by weight. Polyether resins described in the examples by letters are those described in U.S. 2,633,458. The concrete used in the example was prepared from hydraulic cement (Portland cement), aggregate, sand and water.

*Example I*

This example illustrates the preparation of a composition comprising polyether A, a copolymer of butadiene and acrylic acid and paving grade asphalt.

62.5% by weight of paving grade asphalt was heated to 300° F. and then mixed with 11.3 parts by weight of polyether A and 26.0 parts by weight of a copolymer butadiene and acrylic acid having acidity of 0.23 eq./100 g. and prepared as described above. The mixture cured at 125° C. to form a hard tough flexible composition.

In a related experiment, the above mixture of asphalt polyether A and the copolymer was applied as a coating to concrete roadways to form a coating of about 1/16 inch thickness. Sand was sprinkled on the top and the sand compacted by rolling. In a short while, the coating set hard to form a hard solvent and skid resistant coating.

In a further experiment, the above-described composition was combined with an equal weight of hot aggregate and the combined mixture spread out on a prepared roadbed and compacted with rollers. The composition set up to form a hard tough solvent resistant road surface.

The surface differed from conventional asphalt roadways in that it would not soften in heating, was not distorted on application of pressure and did not soften when contacted with jet fuel and gasoline.

Related results are obtained by replacing the above-described butadiene-acrylic acid copolymer with one having an acidity of .08 eq./100 g. as prepared above.

*Example II*

This example illustrates the preparation of a composition comprising polyether A, paving grade asphalt and a copolymer of butadiene and methacrylic acid prepared as described above.

62.5% by weight of paving grade asphalt was heated to 300° F. and then mixed with 37.5% of a 50/50 mixture on an equivalent basis of polyether A and the copolymer of butadiene and methacrylic acid described above. This mixture was cured at 125° C. to form a hard tough but flexible composition.

In a related experiment the above mixture was spread on concrete to form a coating of about 1/16 inch thickness. Sand was sprinkled on the top and compacted by rolling. In a short while, the coating set up to form a hard solvent and skid resistant coating.

In a further experiment, the above-described mixture was combined with an equal amount of hot aggregate and the combined mixture applied to a prepared roadbed. The composition was then compacted with rollers and allowed to set hard. The mixture set up to form a tough solvent resistant and heat resistant roadway. The composition was of particular value in the preparation of jet aircraft maintenance areas because of its excellent solvent and heat resistance.

*Example III*

62.5% by weight of paving grade asphalt was heated to 300° F. and then mixed with 37.5% by weight of a 50/50 mixture on an equivalent basis of polyether A and a copolymer of methyl pentadiene and acrylic acid having a molecular weight of about 1500 and an acrylic acid content of about 25%. This mixture was cured at 125° C. to form a hard tough but flexible composition.

In a related experiment, the above-described mixture was spread on cement concrete to form a coating of about 1/16 inch thickness. Sand was sprinkled on the top and compacted by rolling. In a short while, the coating set up to form a hard solvent and skid resistant coating.

In a further experiment, the above-described mixture was combined with an equal amount of hot aggregate and the combined mixture applied to a prepared roadbed.

The composition was then compacted with rollers and allowed to set hard. The mixture set up to form a tough solvent resistant and heat resistant roadway. The composition was of particular value in the preparation of jet aircraft areas because of its excellent solvent resistance and heat resistance.

*Example IV*

62.5% by weight of paving grade asphalt is heated to 300° F. and then mixed with 37.5% by weight of a 50/50 mixture on an equivalent basis of polyether A and a copolymer of butadiene-styrene-acrylic acid as prepared above. This mixture was cured at 125° C. to form a hard tough but flexible composition.

In a related experiment, the above-described mixture was spread on cement concrete to form a coating of about 1/16 inch thickness. Sand was sprinkled on the top and compacted by rolling. In a short while, the coating set up to form a hard solvent and skid resistant coating.

In a further experiment, the above-described mixture is combined with an equal amount of hot aggregate and the combined mixture applied to a prepared roadbed. The composition is then compacted with rollers and allowed to set hard. The mixture set up to form a tough solvent resistant and heat resistant roadway. The composition is of particular value in the preparation of jet aircraft areas because of its excellent solvent resistance and heat resistance.

*Example V*

62.5% by weight of paving grade asphalt is heated to 300° F. and then mixed with 37.5% by weight of a 50/50 mixture on an equivalent basis of epoxidized tetrahydrobenzyl tetrahydrobenzoate and the acrylic acid-butadiene copolymer defined in Example I. The mixture is stirred and heated to 125° C. for several hours, the resulting product is a hard tough flexible casting.

The above-described composition is also used as a coating for cement concrete and in the preparation of a roadbed in combination with hot aggregate as in Example I. Related results are obtained.

*Example VI*

Examples I to V are repeated with the exception that the polyepoxide is each of the following: epoxidized diallyl eicosadienedioate, epoxidized dimethallyl phthalate, epoxidized dicrotyl adipate, epoxidized di(tetrahydrobenzyl) ether of ethylene glycol and epoxidized polybutadiene. Related results are obtained in each case.

*Example VII*

Examples I to VI are repeated with the exception that the asphalt is replaced with each of the following: bottoms obtained from the distillation of a catalytically cracked gas oil (Dutrex 20), i.e., extract of petroleum distillate having the following properties: gravity ° API 5.8; flash, coc. 415° F.; viscosity, SSU at 210° F., 9611; a high boiling fraction of coking cycle stock (coking a Mid-Continent vacuum flasher bottoms) having a viscosity SSU at 77° F. of 5000 and initial boiling point of 658° F., a molecular weight about 250; and industrial residual fuel oil. Related results are obtained in each case.

I claim as my invention:

1. A composition comprising (1) a polyepoxide having more than one vic-epoxy group, (2) a bituminous material and (3) a copolymer of an alpha,beta-unsaturated monocarboxylic acid containing no more than 6 carbon atoms and a dissimilar ethylenically unsaturated monomer of the group consisting of ethylenically unsaturated hydrocarbons, alkenyl alkyl ethers, alkenyl esters, acrylonitrile, methacrylonitrile, vinyl chloride, N-allyl acrylamide, alkyl acrylates and alkyl methacrylates and mixtures thereof.

2. A composition comprising (1) a polyepoxide having more than one vic-epoxy group, (2) an asphalt and (3) a copolymer of an alpha,beta-unsaturated monocarboxylic acid containing no more than 6 carbon atoms and an ethylenically unsaturated dissimilar monomer of the group consisting of ethylenically unsaturated hydrocarbons, alkenyl alkyl ethers, alkenyl esters, acrylonitrile, methacrylonitrile, vinyl chloride, N-allyl acrylamide, alkyl acrylates and alkyl methacrylates and mixtures thereof.

3. A composition comprising (1) a polyepoxide having more than one vic-epoxy group, (2) a bituminous material of the group consisting of asphalts, residual fuel oils, high boiling extracts of petroleum and petroleum distillates, coal tars, refined coal tars and coal tar pitches and (3) a copolymer of an acrylic acid and an ethylenically unsaturated hydrocarbon containing from 2 to 10 carbon atoms.

4. A composition as in claim 3 wherein the bituminous material is paving grade asphalt.

5. A composition as in claim 3 wherein the bituminous material is residual fuel oil.

6. A composition as in claim 3 wherein the bituminous material is an Edeleanu extract of petroleum distillate.

7. A composition as in claim 3 wherein the polyepoxide is a glycidyl polyether of a polyhydric phenol having the molecular weight between 200 and 900.

8. A composition as in claim 3 wherein the copolymer is a copolymer of acrylic acid and butadiene.

9. A composition as in claim 3 wherein the copolymer is a copolymer of methylpentadiene and acrylic acid.

10. A composition as in claim 3 wherein the copolymer is a copolymer of acrylic acid and isoprene.

11. A composition comprising (1) a liquid glycidyl polyether of a polyhydric phenol, (2) an asphalt material and (3) a copolymer of butadiene, styrene and acrylic acid.

12. A composition comprising (1) a liquid polyepoxide having more than one vic-epoxy group, (2) an asphaltic material, (3) a copolymer of an acrylic acid and an ethylenically unsaturated hydrocarbon and (4) more than 50% by weight of (1), (2) and (3) above of inert particles.

13. A composition as in claim 12 wherein the amount of the liquid polyepoxide comprises 10% to 75% by weight of the mixture of polyepoxide and asphaltic material, the asphaltic material makes up from 75% to 90% of that mixture and the copolymer makes up from 10% to 80% by weight for the polyepoxide.

14. A process for preparing a bituminous material comprising mixing a polyepoxide having more than one vic-epoxy group, a bituminous material and a copolymer of an alpha,beta-ethylenically unsaturated monocarboxylic acid containing no more than 6 carbon atoms and a dissimilar ethylenically unsaturated monomer of the group consisting of ethylenically unsaturated hydrocarbons, alkenyl alkyl ethers, alkenyl esters, acrylonitrile, methacrylonitrile, vinyl chloride, N-allyl acrylamide, alkyl acrylates and alkyl methacrylates and mixtures thereof.

15. A process for preparing a composition useful in preparing roadways and walkways which comprises mixing a polyepoxide having more than one vic-epoxy group with a bituminous material, a copolymer with an acrylic acid and an ethylenically unsaturated hydrocarbon and then combining this mixture with heated aggregate.

16. A process for preparing an improved surface for traffic areas which comprises mixing a liquid polyepoxide having more than one vic-epoxy group with an asphaltic material, a copolymer of an acrylic acid and ethylenically unsaturated hydrocarbon and heated aggregate, mixing the components together, spreading the mixture to the desired thickness, compacting and allowing to set hard.

17. A process for preparing a non-skid surface comprising applying to a surface a composition comprising a polyepoxide having more than one vic-epoxy group, an asphaltic material and a copolymer of an acrylic acid and an ethylenically unsaturated hydrocarbon spreading finely divided inert particles of the coating, compacting the particles and allowing the composition to set hard.

18. A process as in claim 17 wherein the surface to be coated is a cement concrete surface.

19. A process as in claim 17 wherein the surface to be coated is an asphaltic concrete surface.

References Cited in the file of this patent

UNITED STATES PATENTS

| | | |
|---|---|---|
| 2,604,464 | Segall et al. | July 22, 1952 |
| 2,784,128 | Schroeder | Mar. 5, 1957 |
| 2,895,389 | Nagin | July 21, 1959 |
| 2,906,720 | Simpson | Sept. 29, 1959 |
| 2,956,034 | Simpson | Oct. 11, 1960 |

FOREIGN PATENTS

| | | |
|---|---|---|
| 802,099 | Great Britain | Oct. 1, 1958 |